United States Patent
Buczkowski

(10) Patent No.: US 10,642,592 B2
(45) Date of Patent: May 5, 2020

(54) AUTOMATED CONFIGURATION PROFILE GENERATION AND MANAGEMENT

(71) Applicant: International Business Machines Corporation, Armonk, NY (US)

(72) Inventor: Marcin Ł Buczkowski, Katowice (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/151,440

(22) Filed: Oct. 4, 2018

(65) Prior Publication Data

US 2020/0110591 A1  Apr. 9, 2020

(51) Int. Cl.
*G06F 8/61* (2018.01)
*H04L 29/08* (2006.01)
*G06F 9/445* (2018.01)
*G06F 8/65* (2018.01)

(52) U.S. Cl.
CPC .............. *G06F 8/61* (2013.01); *G06F 8/62* (2013.01); *G06F 8/63* (2013.01); *G06F 8/64* (2013.01); *G06F 8/65* (2013.01); *G06F 9/44505* (2013.01); *H04L 67/30* (2013.01); *H04L 67/34* (2013.01)

(58) Field of Classification Search
CPC ..... G06F 8/61; G06F 8/62; G06F 8/63; G06F 8/64; G06F 8/65; G06F 9/44505
See application file for complete search history.

(56) References Cited

U.S. PATENT DOCUMENTS

| 6,117,187 A * | 9/2000 | Staelin ............... G06F 8/61 717/169 |
| 6,789,215 B1 * | 9/2004 | Rupp ................ G06F 8/61 714/38.14 |
| 7,603,443 B2 | 10/2009 | Fong et al. |
| 7,657,871 B2 | 2/2010 | Velupillai |
| 7,937,456 B2 | 5/2011 | McGrath |
| 8,839,234 B1 | 9/2014 | Voronkov et al. |
| 8,990,809 B1 * | 3/2015 | Jacob ............. G06F 9/45533 718/1 |
| 2002/0004935 A1 * | 1/2002 | Huotari ............. H04L 12/12 717/170 |
| 2006/0123414 A1 | 6/2006 | Fors et al. |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Phillip H Nguyen
(74) *Attorney, Agent, or Firm* — Brian M. Restauro, Esq.; Hye Jin Lucy Song, Esq.; Heslin Rothenberg Farley & Mesiti, P.C.

(57) ABSTRACT

Methods, computer program products, and systems are presented. The methods include, for instance: generating one or more property list including restrictions and settings and respective values thereof that are to install a software application on devices running an installation target operating system. Based on the one or more property list, a configuration profile is created. A profile identifier corresponding to the configuration profile is utilized to install and manage the configuration profile by use of a universally applicable script, which is included in an installation package for deployment.

14 Claims, 10 Drawing Sheets

(56) References Cited

U.S. PATENT DOCUMENTS

| | | | | |
|---|---|---|---|---|
| 2006/0248309 A1* | 11/2006 | D'Alterio | ................. | G06F 8/61 |
| | | | | 711/206 |
| 2008/0250050 A1 | 10/2008 | Cracchiolo et al. | | |
| 2011/0296377 A1* | 12/2011 | Morozov | ................. | G06F 8/30 |
| | | | | 717/113 |
| 2016/0103667 A1* | 4/2016 | Chen | ........................ | G06F 8/71 |
| | | | | 717/121 |
| 2016/0110183 A1* | 4/2016 | Fu | ............................ | G06F 8/65 |
| | | | | 717/169 |

OTHER PUBLICATIONS

Palau, "Create a configuration profile," Outlook Exchange Setup 5, GitHub, Inc., Oct. 26, 2017, 2 pages.
"Use the Profiles Command in High Sierra," Krpyted.com, Sep. 9, 2018, 4 pages.
"Remove all OSX profiles through command line," Jamf.com, Mar. 21, 2016, 3 pages.
"Create a Configuration Profile for macOS," https://help.netmotionsoftware.com, Feb. 9, 2018, 1 page.

* cited by examiner

600

```
L601:  <?xml version="1.0" encoding="UTF-8"?>
L602:  <!DOCTYPE plist PUBLIC "-//Apple//DTD PLIST 1.0//EN"
       "http://www.apple.com/DTDs/PropertyList-1.0.dtd">
L603:  <plist version="1.0">
L604:  <dict>
L605:  <key>Label</key> <string>com.pkgr.test</string>
L606:  <key>ProgramArguments</key>
           <array> <string>/Users/pkgr/bin/test.sh</string> </array>
L607:  <key>Nice</key> <integer>1</integer>
L608:  <key>StartInterval</key> <integer>60</integer>
L609:  <key>RunAtLoad</key> <true/>
L610:  <key>StandardErrorPath</key> <string>/tmp/Test1.err</string>
L611:  <key>StandardOutPath</key> <string>/tmp/Test1.out</string>
L612:  </dict>
L613:  </plist>
```

```
L701: #!/bin/bash
L702: cpPayLoadUUID = "6CBCFFBD-135F-4CB9-A376-59429B128BB3"
L703: otherPayLoadUUID = "6CBCFFBD-135F-4CB9-A376-59429B128BB3"
L704: profileName = "SecurityUnsigned.mobileconfig"
L705: listProfiles =$(/usr/bin/profiles -P)
L706: matchUUID="profileIdentifier: ${cpPayLoadUUID}
L707: matchUUID2="profileIdentifier: ${otherPayLoadUUID}
L708: profilePath="/private/tmp/com.ibm.ConfigurationProfile"
L709: isProfile=$(/bin/echo "${listProfiles}|/usr/bin/grep "${matchUUID}")
L710: otherProfile=$(/bin/echo "${listProfiles}|
L711:             /usr/bin/grep "${matchUUID2}" |
L712:             /usr/bin/awk '{print $4}')
L713: if [[${otherProfile} == ${otherPayLoadUUID}]] ; then
L714:             /usr/bin/profiles -R -p "${otherPayLoadUUID}"
L715: fi
L716: if [[ !${isProfile} ]] ; then
L717:    if [ -e "${profilePath}/${profileName}" ] ; then
L718:     /usr/bin/profiles -I -F "${profilePath}/${profileName}"
L719:     if [[ ${?} != 0]] ; then
L720:        /bin/echo "Invalid Configuration Profile"
L721:        /bin/rm -rf "${profilePath}"
L722:        exit 2
L723:     fi
L724:     /bin/rm -rf "${profilePath}"
L725:     exit 0
L726:    else
L727:     /bin/echo "Configuration Profile - file not found"
L728:     if [-d "${profilePath}"] ; then
L729:        /bin/rm -rf "${profilePath}"
L730:     fi
L731:     exit 3
L732:    fi
L733: else
L734:    exit 0
L735: fi
```

FIG. 7

AUTOMATED CONFIGURATION PROFILE GENERATION AND MANAGEMENT

TECHNICAL FIELD

The present disclosure relates to software application production technology, and more particularly to methods, computer program products, and systems for automating generation of configuration profile and installation package.

BACKGROUND

Conventionally, configuration profile for a software application is generated based on a couple of snapshots on a bare target platform. A first snapshot is taken before installing the software application. Then a human software engineer, referred to as a packager, who creates an installation package for the software application manually installs the software application in the target platform by setting system parameters on devices and applications configuration required for the software application to be functional. Certain system parameters may be present in more than one system file in the target platform, and the redundancies are identified and removed, if unnecessary, during the installation by the packager. A second snapshot is taken after the installation is complete, the differences between the second snapshot and the first snapshot are extracted and set as a configuration profile for the software application.

SUMMARY

The shortcomings of the prior art are overcome, and additional advantages are provided, through the provision, in one aspect, of a method. The method includes, for instance: generating, by one or more processor, one or more property list including restrictions and settings and respective values thereof to install a software application on devices running an installation target operating system; creating, by the one or more processor, a configuration profile based on the one or more property list from the generating, wherein the configuration profile corresponds to a profile identifier that uniquely identifies the configuration profile; building, by the one or more processor, a universal installation package including the configuration profile and a script including the profile identifier is universally applicable to the devices, wherein the script is utilized for installing and managing the configuration profile on the devices; and uploading, by the one or more processor, the universal installation package to a management tool of the installation target operating system for deployment on the devices.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts an exemplary property list, in accordance with one or more embodiments set forth herein;

FIG. 7 depicts an exemplary installer/uninstaller script for the universal installation package, as generated by the configuration profile automation engine, in accordance with one or more embodiments set forth herein;

DETAILED DESCRIPTION

Figure 1:
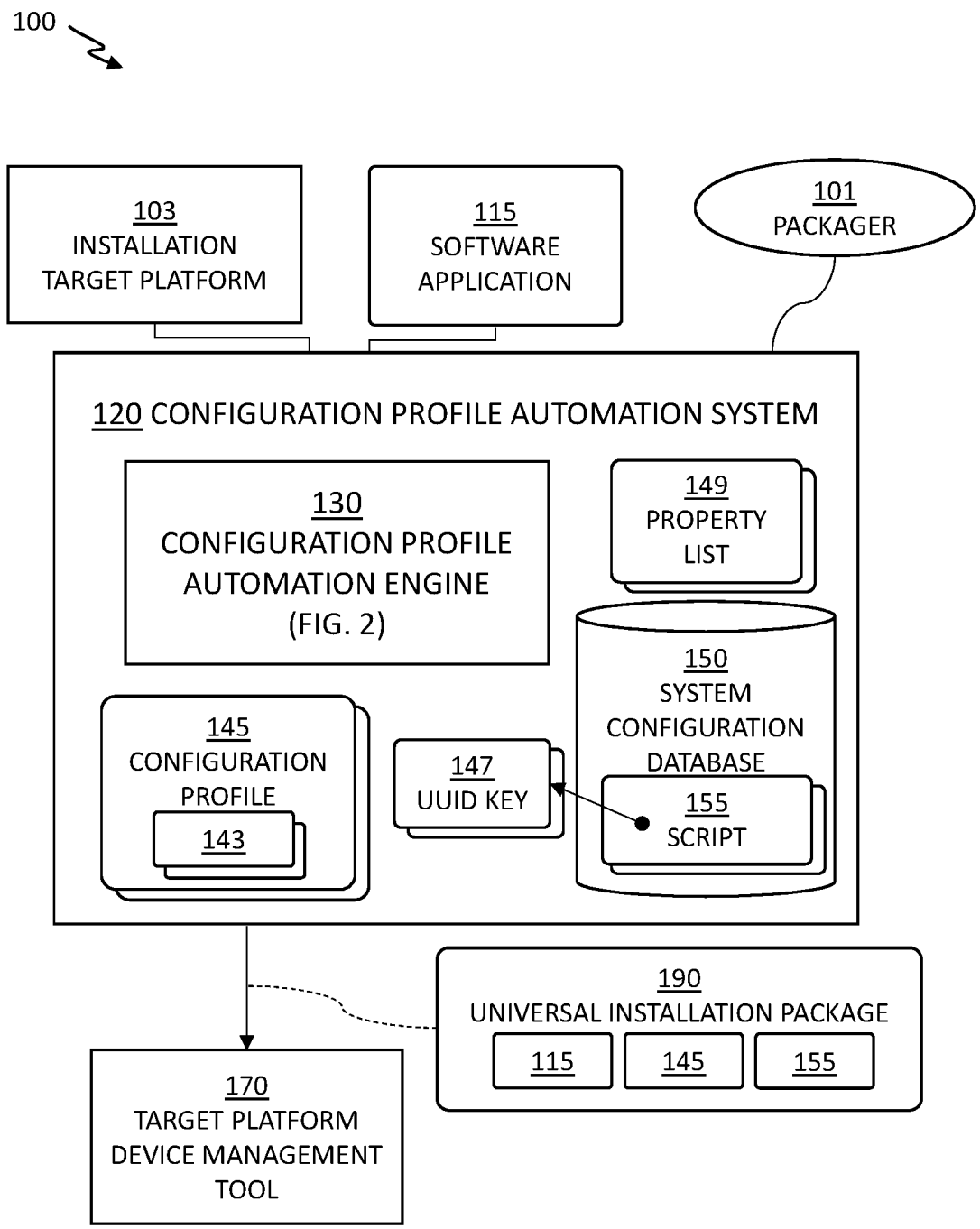
FIG. 1 depicts a system for automatically generating universal installation packages, in accordance with one or more embodiments set forth herein.

FIG. 1 depicts a system 100 for automatically generating universal installation packages, in accordance with one or more embodiments set forth herein.

Embodiments of the present invention recognize that conventional methods to generate an installation package based on snapshots are manual, time consuming, labor intensive, and error-prone. The installation package is generated to install a software application in computer systems running a certain operating system. Based on the operating system specification and system requirements of the software application, the installation package needs to include a certain group of settings required and/or desirable to install the software application in the computer systems. In order to create such group of settings, a human engineer who works on the installation package manually generates various snapshots in various target computer systems before and after installing the software application and utilizes the snapshots as configuration profiles in the installation package for the software application. As the snapshot includes all system files in the target computer systems, some system configurations may be unrelated and not necessary for installing the software application. However, it is difficult for the human engineer to manually sort out the configuration profile without any redundancies nor omissions in restrictions/files due to the complexity and the sizes of the configuration profile to process, which results in inefficiency in configuration profile generation and management thereof as well as performance with the software application in the target computer system.

Embodiments of the present invention recognize that, with conventional method of generating configuration profiles for installation packages, the performance efficiency in generating the installation package and the quality of the installation package product vary depending on skill level/experience of individual engineers who generates the configuration profiles and the resulting installation packages, because the process is manual and individually managed. Also, the installation package needs to be manually generated from the scratch whenever a new version of the same software application is to be packaged for deployment. The configuration profile in the installation packages are neither reusable nor updatable according to the updates within new versions of the software application, and the configuration profile may be corrupted by an end user of a device in which the software application has been installed. In conventional installation packages, the configuration profile needs to be downloaded from an installation server, which generates a great network traffic along with the payload that includes the actual file for the software application to be installed in an installation target device.

Embodiments of the present invention recognize that, even if conventional automation frameworks in a specific target platform for software packaging and distribution exist, the conventional automation frameworks lack user interface in generating the configuration profile and do not offer any method to prove the installation and management process in deploying the configuration profile.

The system 100 for automatically generating universal installation packages includes a configuration profile automation system 120. The configuration profile automation system 120 generates a universal installation package 190 of a software application 115 for an installation target platform 103. The installation target platform 103 indicates a combination of a computer system on which a specific operating system runs. The software application 115 had been previously created for one or more versions of the specific operating system of the target platform 103, and in an executable format of multiple files. A packager 101 is a software engineer who runs the configuration profile automation system 120 in creating the universal installation package 190.

The configuration profile automation system 120 includes a configuration profile automation engine 130, a configuration profile 145, one or more Universally Unique Identifier (UUID) key 147, one or more property list 149, and a system configuration database 150.

The configuration profile 145 includes a full set of restrictions and settings 143 to install and to run the software application 115 on the installation target platform 103, which is represented in the one or more property list 149. The configuration profile automation engine 130 produces the configuration profile 145 by use of the one or more property list 149, and generates the universal installation package 190 by combining the software application 115, the configuration profile 145, the UUID key 147, and an installer/uninstaller script 155 for the software application 115. The configuration profile 145 that has been generated by the configuration profile automation engine 130 is applicable to all versions of the software application 115, and accordingly the installation package is referred to as universal for facilitating installation for all versions of the software application 115.

The one or more property list 149 includes some of the restrictions for the software application 115 to run on the installation target platform 103, particularly a set of restrictions that stores setting by users while configuring the software application 115. The property list 149 can be made available for the configuration profile automation engine 130 from previous installations of another instance and/or a previous version of the software application 115. The configuration profile automation engine 130 generates the property list 149 based on a snapshot of the installation target platform 103, in cases where the restrictions and settings 143 are not available.

The configuration profile automation engine 130 creates the UUID key 147 in order to identify the configuration profile 145 for the software application 115 in the installation target platform 103. By use of the UUID key 147, the configuration profile 145 that had been used for installing the universal installation package 190 on a certain instance of the installation target platform 103 can be uniquely identified after the installation/deployment. The UUID key 147 is also used to identify the configuration profile 145 after installation, for uninstallation and update of the configuration profile 145.

Embodiments of the present invention recognize that a UUID, also referred to as a globally unique identifier (GUID), is a 128-bit number used to easily identify any piece of information in computer systems, independent from any central controlling entity for registration with almost no concern for a duplicate. Embodiments of the present invention also recognize that in certain management systems of Apple® platform utilizes UUID keys to identify profiles for management purposes specific to the management system, independent from the UUID key 147 identifying the configuration profile 145 in the universal installation package 190. (Apple is a registered trademark of Apple Inc., in the United States and/or other countries.)

The system configuration database 150 stores various system configuration information, including previously generated UUID keys 147, the restrictions and settings 143, property lists 149, configuration profiles 145, the installer/uninstaller script 155, and any other configuration information that can be applied to installing and managing the software application 115. The system configuration database 150 can further store similar combinations of system configuration information for other software applications, which will be indexed for respective software application to which the system configuration information is applicable.

The configuration profile automation system 120 produces the universal installation package 190 to a target platform device management tool 170. The target platform device management tool 170 deploys the software application 115 on multiple instances of the installation target platform 103 by use of the configuration profile 145 in the universal installation package 190, according to a deployment policy as specified in the target platform device management tool 170.

In a certain embodiment of the present invention, the installation target platform 103 is a combination of a Mac® device runs macOS®, which is a series of graphical operating system for Mac family of computers by Apple Inc. (Mac and macOS are registered trademarks of Apple Inc., in the United States and/or other countries.) The installation target platform 103 includes respective tools for user authentication, system snapshot creation, binary encryption/decryption, and conventional installation package generation, including corresponding configuration profiles.

In the same embodiment as above, the configuration profile 145 is a file, in Extensible Markup Language (XML) format, that is used to distribute configuration information, which specifies device settings and behavior in the installation target platform 103 running macOS. The configuration profile 145 is useful for configuring a large number of devices or to provide numerous custom email settings, network settings, or certificates to a large number of devices. Examples of restrictions and settings that are contained in the configuration profile 145 for installing and for running the software application 115 include, but are not limited to, access restrictions on device hardware and software; restrictions on device features; file/directory access rights as in read/write permissions as used in parental control setting; Wi-Fi settings for radio/wireless local area networking of devices based on the Institute of Electrical and Electronics Engineers (IEEE) 802.11 standards; Virtual Private Network (VPN) settings; electronic mail server settings; exchange settings; the Lightweight Directory Access Protocol (LDAP) directory service settings; CalDAV calendar service settings, supporting an Internet standard facilitating a client to access scheduling information on a remote server, by use of an extended HTTP-based protocol for data manipulation referred to as Web Distributed Authoring and Versioning (WebDAV) in order to use iCalendar format for the data; web clips; and credentials and keys. In the same embodiment, the configuration profile 145 can be certified by Apple configurator in a comprehensive enterprise management software such as Jamf Software Server (JSS), assuring that the configuration is trustworthy across various instances of the installation target platform 103 in installing/managing the software application 115 and the configuration profile 145 corresponding to the software application 115.

In the same embodiment, the property list 149 is represented in a format with filenames with ".plist" extension, in which serialized objects representing various information are stored. ".plist" property list files often used to store a set of settings by a user, compatibility information about bundles and applications, a task served by the resource fork in Mac OS, which is a predecessor of the macOS. ".plist" format is a flexible and convenient format originally defined by Apple Inc., which is represented in Extensible Markup Language (XML) and can be viewed and edited with a simple text editor. In cases where the ".plist" property list 149 is not available, the configuration profile automation engine 130 generates the ".plist" file based on a snapshot of the installation target platform 103. Conventionally, an installer involves a ".dmg" file in the macOS, which indicates a mountable disk image file that contains raw block data that are compressed and/or encrypted. The raw block data, as in the case of the snapshot, in ".dmg" files are commonly used as a configuration profile for conventional software installers. When the installer is opened for a run, the ".dmg" files are downloaded from the Internet and mounts a virtual disk on a desktop of a current instance of the installation target platform 103, in contrast with the configuration profile 145 that is enclosed in the universal installation package 190. Accordingly, the universal installation package 190 can be installed with much less network traffic than conventional installers. In the same embodiment, the configuration profile 145 is represented as a ".mobileconfig" file format, which stores a myriad of system and user preferences in the macOS. The configuration profile 145 is universal to all versions of the software application 113, and can be entirely customized per user preferences without recommended system settings for individual restrictions.

In the same embodiment as above, the configuration profile automation system 120 further includes a binary encryption/decryption tool to convert a property list in a binary format to and from a text equivalent of the property list, which is not presented in FIG. 1, as being part of the installation target platform 103 or otherwise as a system utility.

In the same embodiment, the target platform device management tool 170 is an instance of Apple Deployment Programs with a mobile device management (MDM) security software solution that monitors, manages, and secures multiple mobile devices that are deployed across multiple mobile service providers and across multiple mobile operating systems being used in an organization, in order to offer transparent services as well as flexible and secure control over deployments of various software applications.

The configuration profile automation system 120 replaces conventional profile creation and generation mechanism as performed by the MDM of macOS, and can be integrated into macOS as a system utility.

In the same embodiment, the universal installation package 190 can be represented in a ".pkg" conventional installation package file, which includes "Scripts" file and "Payload" file. The "Scripts" file contains the installer/uninstaller script 155 to perform for installing the software application 115 to a hard disk drive of the current instance of the installation target platform 103, and/or uninstalling a previously installed version of the software application 115 from the hard disk drive. The configuration profile 145 is identified as the UUID key 147 within the installer/uninstaller script 155. The "Payload" file contains compressed installation files for the software application 115 that is subject to operations for the installer/uninstaller script 115 in the "Scripts" file.

Embodiments of the present invention automatically generates the configuration profile 145 for installation of the software application 115. The configuration profile 145 is uniquely identified by use of the UUID key 147, which is used to manage the configuration profile 145 in the installation target platform 103 subsequent to installing the software application 115. The UUID keys 147 corresponding to respective configuration profiles 145 are stored in the system configuration database 150, and utilized to manage a collection of configuration profiles for a multiple instances of the installation target platform 103 as an ecosystem of macOS devices, rather than a random collection of individual devices that requires respective management schemes. By use of the system configuration database 150, a previously generated configuration profile 145 for a previous version of the software application 115 can be distributed to other instances of the installation target platform 103. The configuration profile automation system 120 can create and manage the configuration profile 145 separately from the universal installation package 190, if necessary. The configuration profile automation system 120 creates the universal installation package 190 as a combination of the software application 115, the configuration profile 145, and the installer/uninstaller script 155, such that the universal installation package 190 is operational in any MDM system for managing various devices running macOS. The universal installation package 190 can be distributed with the target platform device management tool 170 for deploying the software application 115. By use of the UUID keys 147, the configuration profile 145 in the universal installation package 190 is certified, identified, and fully managed with its restrictions and settings.

Embodiments of the present invention offer the packager 101 to automatically create and manage configuration profiles based on UUID keys, not only for installation and deployment, but also for post-installation management of configuration profiles. Embodiments of the present invention automatically creates the universal installation package 190 that supports distribution and deployment of the software application 115 by the target platform device management tool 170, which is applicable for all versions of the software application 115 and across types of devices of the installation target platform 103.

Figure 2:
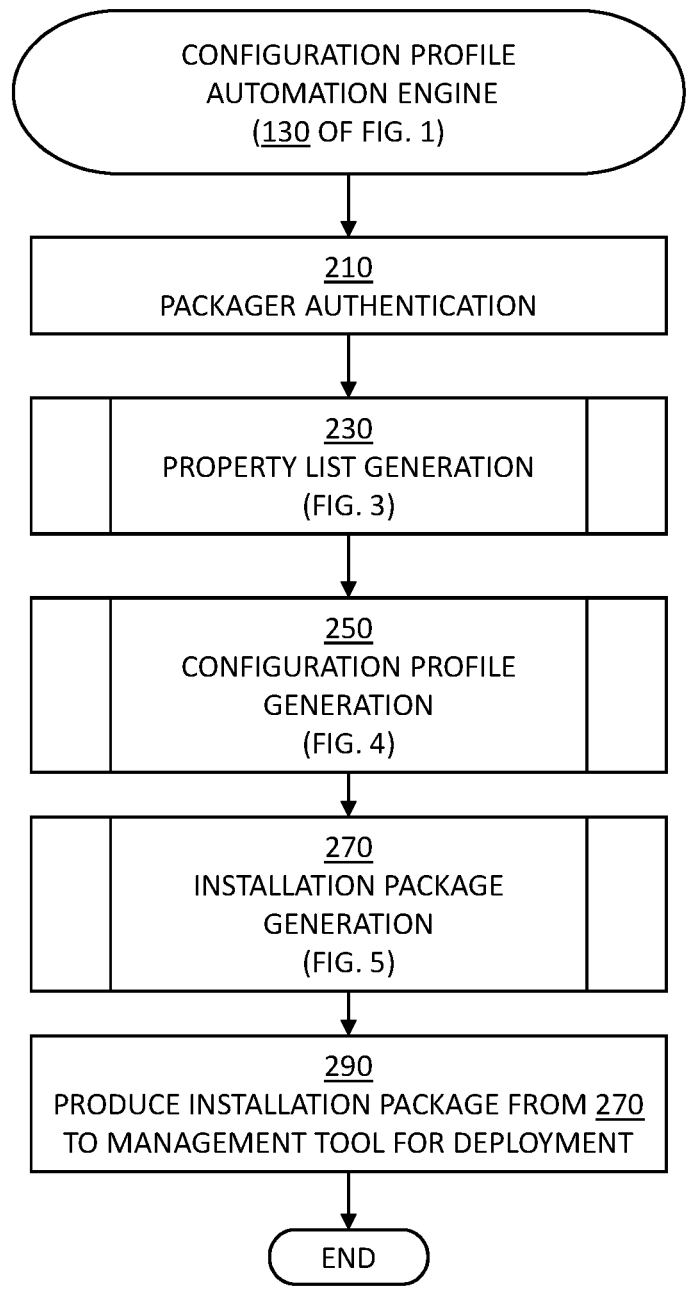
FIG. 2 depicts a flowchart of operations performed by the configuration profile automation engine, in accordance with one or more embodiments set forth herein.

FIG. 2 depicts a flowchart of operations performed by the configuration profile automation engine 130, in accordance with one or more embodiments set forth herein.

In block 210, the configuration profile automation engine 130 authenticates the packager 101 to ascertain that the packager 101 has an administrator access right to a current instance of the installation target platform 103. The blocks of 230, 250, 270, and 290 following block 210 generates the universal installation package 190 that can be deployed across multiple instances of the installation target platform 103. Because the universal installation package 190 is a launched product for the software application 115, only a selected group of software engineers are authorized to create the universal installation package 190. Also, in order to perform operations in blocks of 230, 250, 270, and 290, the configuration profile automation engine 130 requires an administrator access to the current instance of the installation target platform 103. Accordingly, the configuration profile automation engine 130 ascertains that the packager 101 who accesses the configuration profile automation engine 130 has a valid authority to run the configuration profile automation engine 130. If configuration profile automation engine 130 cannot authenticate the packager 101, the configuration profile automation engine 130 terminates processing, or iterates the authentication process. The flow in case of failed authentication is not presented in this specification. If the configuration profile automation engine 130 successfully authenticates the packager 101, the configuration profile automation engine 130 proceeds with block 230.

Certain embodiments of the present invention can be configured to assign an administrator access to the configuration profile automation engine 130, such that the packager 101 can run the configuration profile automation engine 130 only with the administrator login credentials. In the same embodiment, the configuration profile automation engine 130 does not run block 210 and begins at block 230.

Prior to block 230, the current instance of the installation target platform 103 may have a previously installed version of the software application 115, of which settings are certified by a proper certificate authority. In certain embodiments of the present invention, Jamf Software Server (JSS) Certificate Authority (CA) is employed in an organizational environment of multiple instances of the installation target platform 103 in order to certify respective settings on installation target platforms 103 for the software application 115. The JSS is a comprehensive enterprise management software to simplify IT management for various Apple platforms devices such as Mac, iPad®, iPhone® and Apple TV®. (iPad, IPhone, and Apple TV are registered trademarks of Apple Inc., in the United States and/or other countries.)

In cases where the software application 115 had been previously installed in the current instance of the installation target platform 103, the configuration profile automation engine 130 identifies a configuration profile for the previous installation by use of a UUID key 147 stored in the system configuration database 150.

In block 230, the configuration profile automation engine 130 generates the property list 149 that contributes to the configuration profile 145. Detailed operations of block 230 as performed by the configuration profile automation engine 130 are presented in FIG. 3 and corresponding description. Then, the configuration profile automation engine 130 proceeds with block 250.

As shown below in descriptions of FIG. 3, the configuration profile automation engine 130 can generate the property list 149 by distinctive paths. Where the software application 115 had been previously installed in the current instance of the installation target platform 103, the configuration profile automation engine 130 loads a previous configuration profile used for the previous installation by identifying a location of the previous configuration profile. The configuration profile automation engine 130 converts the previous configuration profile to a standard format such as XML file, and generates a UUID key for the previous configuration profile. By use of the UUID key for the previous configuration profile, the configuration profile automation engine 130 identifies the previous configuration profile for uninstallation.

In cases where the previous installation had been performed by the configuration profile automation engine 130, then the configuration profile automation engine 130 can simply retrieve the UUID key 147 corresponding to the previous configuration profile from the system configuration database 150, without having to generate the UUID key for the previous configuration profile, because the configuration profile automation engine 130 had generated and stored the UUID key 147 corresponding to the configuration profile 145 during the previous installation of the software application 115. By use of the UUID keys, the configuration profile automation engine 130 identifies the configuration profiles, and manages the configuration profiles by uninstalling and/or replacing with a latest version of the configuration profile 145 that corresponds to a current version of the software application 115.

The configuration profile automation engine 130 automatically generates and/or retrieves a script as to how to operate with an identified configuration profile. The script may be an installer script, an uninstaller script, or an update script, which may be selected based on, including but not limited to, options selected by the packager 101, the previously installed version of the software application 115, the current version of the software application 115, and respective system requirements, restrictions and settings as represented in the respective configuration profiles, system requirements for updating the previously installed version to the current version of the software application 115, and whether or not the current instance of the installation target platform 103 meets the system requirements for the updating.

The configuration profile automation engine 130 converts the property list 149 and the configuration profile 145 in respective binary format to a standard readable/editable format such as XML file for screening and modification to adjust the restrictions and settings for the current version of the software application 115, by use of various system utilities offered in devices of the installation target platform 103.

In block 250, the configuration profile automation engine 130 generates the configuration profile 145 for the universal installation package 190. Detailed operations of block 250 as performed by the configuration profile automation engine 130 are presented in FIG. 4 and corresponding description. Then, the configuration profile automation engine 130 proceeds with block 270.

As shown in descriptions of FIG. 4 below, the configuration profile automation engine 130 generates the UUID key 147 corresponding to the configuration profile 145 and stores the UUID key 147 in the system configuration database 150. The packager 101 can identify the configuration profile 145 by the UUID key 147, for later update/modification on the universal installation package 190, particularly for uninstallation or update of the software application 115 where the configuration profile 145 should be removed or replaced with a new configuration corresponding to a new version of the software application 115.

In block 270, the configuration profile automation engine 130 generates the universal installation package 190 based on the software application 115 and the configuration profile 145. Detailed operations of block 270 as performed by the configuration profile automation engine 130 are presented in FIG. 5 and corresponding description. Then, the configuration profile automation engine 130 proceeds with block 290.

Embodiments of the present invention recognize that the universal installation package 190 is often required to perform functionalities of removing older versions of the same software application 115 entirely from the current instance of the installation target platform 103 as well as updating the older versions of the same software application 115 while installing a new version of the software application 115. The installer/uninstaller script 155 can be performed in order to update/manage the software application 115 in certain instances of the installation target platform 103. Various installer/uninstaller script templates are stored in the system configuration database 150, and made available to the configuration profile automation engine 130 in the current instance of the installation target platform 103.

In block 290, the configuration profile automation engine 130 produces the universal installation package 190 resulting from block 270 to the target platform device management tool 170 for deployment. Then, the configuration profile automation engine 130 terminates processing.

The universal installation package 190 is for distribution of the software application 115 and the configuration profile 145 to numerous instances of the installation target platform 103 by the target platform device management tool 170. Examples of the target platform device management tool 170 include the MDM in macOS. After the software application 115 is installed in a device, which is an instance of the installation target platform 103, the configuration profile 145 appears in the "Profiles" tab in System Preferences of the device. The configuration profile 145 is certified while generating the universal installation package 190, and accordingly, cannot be uninstalled by an end user who does not have an administrator access to the device.

When the universal installation package 190 is uploaded to MDM services, the software application 115, the installer/uninstaller script 155, and the configuration profile 145 of the universal installation package 190 are universally applicable for all MDM systems supporting macOS management. The configuration profile 145 is usable across all Apple devices, and a proper, user-friendly, and automated installation and management of the configuration profile 145 is available by running the installer/uninstaller script 155 of the universal installation package 190 with minimal user interference.

The universal installation package 190 takes less time and effort on the packager 101 to generate than with the conventional snapshot-based method, while providing a more accurate configuration profile as well as a better ways to install the configuration profile and to manage the configuration profile after the installation, particularly where the software application 115 requires a high-complexity configuration profile. As noted, the configuration profile automation engine 130 can reuse previously created configuration profile for a new version of the same software application, or create a new configuration profile based on a preexisting configuration profile, which results in significantly improved efficiency in creating the configuration profile 145 and the universal installation package 190 than the conventional snapshot-based method of creating the configuration profiles. Accordingly, subsequent versions of the software application 115 can be prepared with less error and be ready for deployment in shorter time than a first release of the software application 115.

Figure 3:
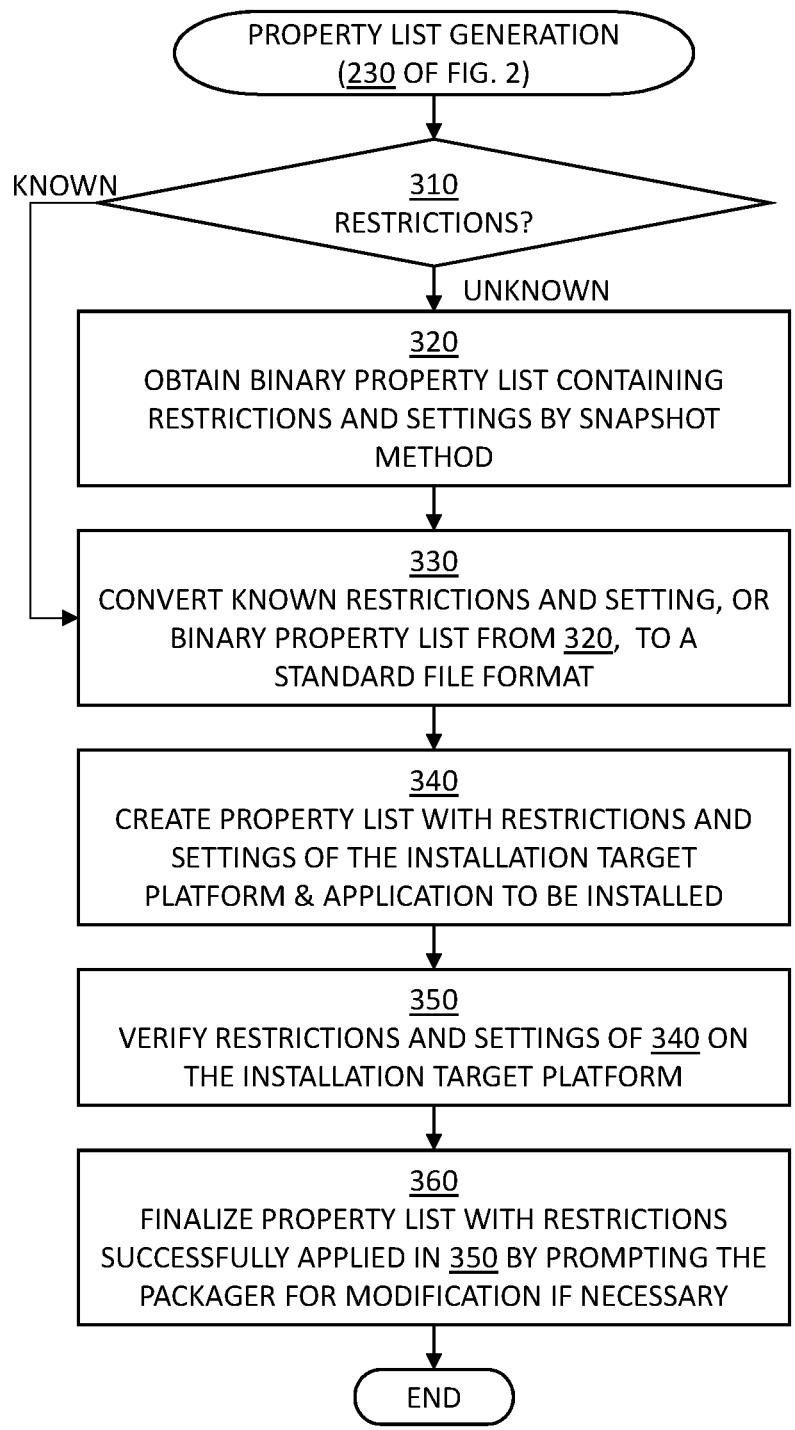
FIG. 3 depicts a flowchart for generating property lists as performed in block 230 of FIG. 2, in accordance with one or more embodiments set forth herein.

FIG. 3 depicts a flowchart for generating property lists as performed in block 230 of FIG. 2, in accordance with one or more embodiments set forth herein.

In block 310, the configuration profile automation engine 130 determines whether or not the restrictions and settings necessary for installing and running the software application 115 are known. Individual restrictions or settings 143 are elements of the property list 149, which is a part of the configuration profile 145. Certain restrictions and settings 143 and/or property lists 149 can be present in the installation target platform 103 independent of the software application 115, as a part of the system configuration. If the configuration profile automation engine 130 determines that the restrictions and settings for the software application 115 are known, the configuration profile automation engine 130 proceeds with block 330. If the configuration profile automation engine 130 determines that the restrictions and settings for the software application 115 are not known, the configuration profile automation engine 130 proceeds with block 320.

In one embodiment of the present invention, the configuration profile automation engine 130 checks if a configuration profile from installing a previous version of the software application 115 is present in the current instance of the installation target platform 103, in determining whether or not the restrictions and settings are known. Provided that the previous version of the software application 115 had been installed in a device of a same type as the current instance of the installation target platform 103, a configuration profile corresponding to the previous version of the software application 115 would be present in the device, which includes restrictions and settings necessary to install and to run the previous version of the software application 115 that are likely to be applicable to a current version of the software application 115.

In the same embodiment of the present invention, provided that the previous version of the software application 115 had been installed by use of the configuration profile automation system 120, then, a UUID key 147 corresponding to the previous version of the software application 115 is stored in the system configuration database 150. Accordingly, the configuration profile automation engine 130 can identify the previous configuration profile by use of the UUID key 147, and determine whether or not the restrictions and settings necessary to install and to run the current version of the software application 115 by simply searching the system configuration database 150 for the UUID key 147.

In the same embodiment of the present invention, the configuration profile automation engine 130 checks previously installed profiles in the current instance of the installation target platform 103, and retrieves the UUID key to search the system configuration database 150. Alternatively, the packager 101 can interactively provide any UUID keys applicable for the software application 115 through a user interface of the configuration profile automation engine 130. The UUID key that identifies the configuration profile is used to review and modify the current restrictions and settings interactively by the packager 101 as well as to define operations for the restrictions and settings to be automatically performed by use of the installer/uninstaller script 155.

In block 320, the configuration profile automation engine 130 obtains a binary property list containing the restrictions and settings necessary to install and to run the current version of the software application 115 by use of a snapshot method, which is conventionally used for generating a configuration profile for an installation package. The configuration profile automation engine 130 performs block 320 when no restrictions and settings necessary to install and to run the current version of the software application 115 on the current instance of the installation target platform 103, as determined in block 310. Then, the configuration profile automation engine 130 proceeds with block 330.

Embodiments of the present invention recognize that the snapshot method is not within the scope of the present invention. However, in cases where the restrictions and settings necessary to install and to run the current version of the software application 115 are unknown, the configuration profile automation engine 130 automatically performs the snapshot method in order to establish a baseline of the restrictions and settings necessary for the software application 115. Accordingly, the configuration profile automation engine 130 takes a snapshot of the installation target platform 103 prior to installation of the software application 115, subsequently installs the software application 115 on the installation target platform 103, and then takes another snapshot of the installation target platform 103 after installation of the software application 115. During the installation of the software application 115, the installation target platform 103 applies various system restrictions, system recommended settings, and user custom settings for the software application 115. Consequently, the post-installation snapshot of the installation target platform 103 includes various restrictions and settings that had been applied during the installation of the software application 115, and, by comparing and extracting the differences in the configurations between pre-installation snapshot and the post-installation snapshot, the configuration profile automation engine 130 can establish the binary property list containing the restrictions and settings for the software application 115. It is often the case that a system snapshot is a system memory dump including all system configuration information, and accordingly, the restrictions and the settings are represented in machine data format, that is, binary data.

In block 330, the configuration profile automation engine 130 converts the restrictions and settings as discovered up to block 330 to a standard file format, in order to facilitate review and modification on the restrictions and settings by the packager 101. As noted, the restrictions and settings are either preexisting in the installation target platform 103 from installing the previous version of the software application 115 as discovered from block 310, or the binary property list as created by the snapshot method from block 320. Then, the configuration profile automation engine 130 proceeds with block 340.

In certain embodiments of the present invention, the configuration profile automation engine 130 converts the binary property list including the restrictions and settings for installing the software application 115 to any human readable and editable format. In certain embodiments, the standard file format is predefined as an XML file, which the packager 101 can review and modify individual restrictions and settings if necessary. The restrictions and settings are often represented in respective key-value pairs (KVPs) in the standard file format, which the packager 101 can view and edit with a simple text editor that is offered as a system utility and/or as a part of any integrated development environment. With each KVP in XML format, a name of a restriction is represented between <key> and </key> tags, and a value corresponding to the restriction follows the name of the restriction by use of one or more tags appropriate for the data type of the value, such as <string> and </string>, <integer> and </integer>, <array> and </array>, etc.

In block 340, the configuration profile automation engine 130 creates a property list with the restrictions and settings of the installation target platform 103 on which the software application 115 is to be installed, as resulting from block 330. Then, the configuration profile automation engine 130 proceeds with block 350.

In block 350, the configuration profile automation engine 130 applies the restrictions and settings from block 340 to the current instance of the installation target platform 103 for verification. Then, the configuration profile automation engine 130 proceeds with block 360.

In block 360, the configuration profile automation engine 130 finalizes the property list from block 340 based on the verification result from block 350. The configuration profile automation engine 130 includes any restrictions and settings that had been successfully applied to the current instance of the installation target platform 103 in the property list as created from block 340. The configuration profile automation engine 130 prompts the packager 101 to modify any restrictions or settings that had not been verified for the current instance of the installation target platform 103, upon which the packager 101 interactively modifies values of the restrictions or settings in the property list from block 340. Then, the configuration profile automation engine 130 proceeds with block 250 of FIG. 2, of which operations are detailed in FIG. 4.

Figure 4:
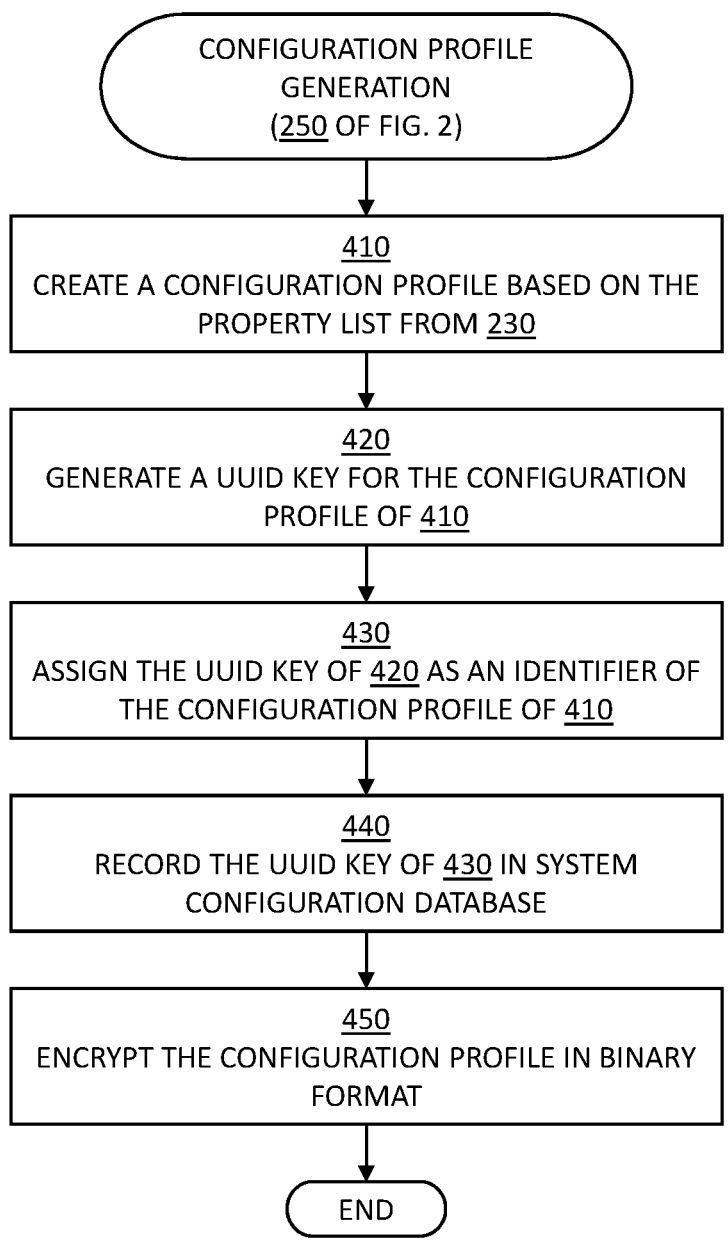
FIG. 4 depicts a flowchart for generating a configuration profile as performed in block 250 of FIG. 2, in accordance with one or more embodiments set forth herein.

FIG. 4 depicts a flowchart for generating a configuration profile as performed in block 250 of FIG. 2, in accordance with one or more embodiments set forth herein.

In block 410, the configuration profile automation engine 130 creates the configuration profile 145 based on the property list 149 from block 230. Then, the configuration profile automation engine 130 proceeds with block 420.

In block 420, the configuration profile automation engine 130 generates a UUID key 147 to identify the configuration profile 145 that has been generated from block 410. The UUID key 147 is to represent the configuration profile 145 by the name and value of the UUID key 147 within the installer/uninstaller script 155 of the universal installation package 190, instead of including the body of the configuration profile 145 in the installer/uninstaller script 155. In cases where the configuration profile 145 had been determined as preexisting from block 310, the configuration profile automation engine 130 already has the UUID key 147 that identifies the preexisting configuration profile, and accordingly, the configuration profile automation engine 130 reuses the same UUID key 147 as the configuration profile from a previous installation of the software application 115, without generating a new UUID key 147, to keep the value of the UUID key 147 consistent for all versions of the software application 115. Then, the configuration profile automation engine 130 proceeds with block 430.

In block 430, the configuration profile automation engine 130 assigns the UUID key 147 from block 420 as an identifier of the configuration profile generated from block 410, such that the configuration profile automation engine 130 uses the UUID key 147 to locate the configuration profile 145. Then, the configuration profile automation engine 130 proceeds with block 440.

In block 440, the configuration profile automation engine 130 records the UUID key 147 assigned to the configuration profile 145 in the system configuration database 150. The configuration profile automation engine 130 keeps available UUID keys for all software applications that are currently installed in the installation target platform 103 for coherent management of the configuration profiles with the installation/management script by storing the UUID keys in the system configuration database 150, as described in block 310 of FIG. 3. Then, the configuration profile automation engine 130 proceeds with block 450.

In one embodiment of the present invention, the configuration profile automation engine 130 utilizes CoreData by Xcode in implementing the system configuration database 150. By use of the UUID keys stored in the system configuration database 150, the configuration profile automation engine 130 can easily access the configuration profile for post-installation maintenance operations such as uninstallation and update of the software application and/or the configuration profile.

In block 450, the configuration profile automation engine 130 encrypts the configuration profile 145 into binary format. The configuration profile 145 is to be referred to numerous times during installation of the software application 115, and accordingly, a binary configuration profile would perform more efficiently than a text configuration profile that requires extra interpretation during the installation, particularly when the configuration profile 145 contains multiple compressed files of large property lists. Then, the configuration profile automation engine 130 proceeds with block 270 of FIG. 2, of which operations are detailed in FIG. 5.

Figure 5:
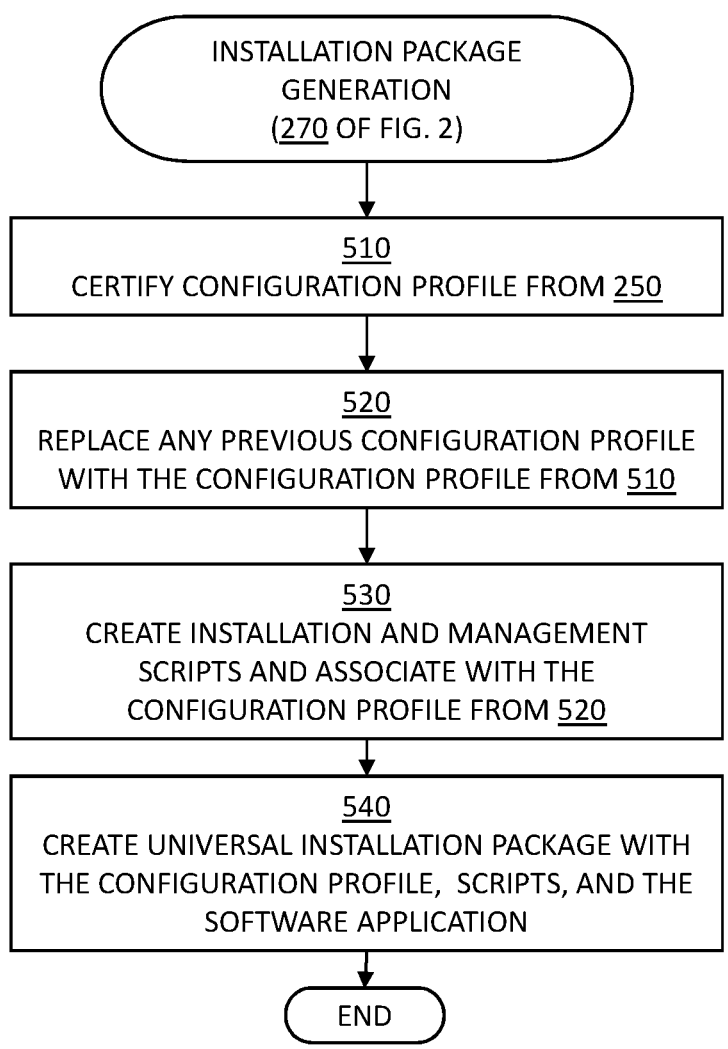
FIG. 5 depicts a flowchart for generating the installation package as performed in block 270 of FIG. 2, in accordance with one or more embodiments set forth herein.

FIG. 5 depicts a flowchart for generating the installation package as performed in block 270 of FIG. 2, in accordance with one or more embodiments set forth herein.

In block 510, the configuration profile automation engine 130 certifies the configuration profile 145 from block 250 as a security measure, to ensure that the configuration profile 145 can be trusted on the installation target platform 103 for installing the software application 115. Then, the configuration profile automation engine 130 proceeds with block 520.

In one embodiment of the present invention, the configuration profile automation engine 130 is implemented in Swift programming language developed by Apple Inc. In the same embodiment, the configuration profile automation engine 130 certifies the configuration profile 145 created in block 250 of FIG. 2 by use of a configuration process referred to as JSS Certificate authority (CA) certification on the installation target platform 103. As noted above in FIG. 1, the JSS is a comprehensive enterprise management software for the Apple platform that simplifies IT management across devices types of the Apple platform. Alternatively, the configuration profile automation engine 130 can use other trusted certifying entity, for example, an IT department of a company in a corporate environment, or system tools offered in Apple platform such as Profile Manager, Apple Configurator, or MDM system. Certifying the configuration profile 145 is to promote the security of the installation target platform 103 by assuring that the configuration profile 145 has been properly created and had not been tampered. Each property list 149 that constitutes the configuration profile 145 can be individually certified, and propagate as a separate file. For example, a property list including restrictions and settings on mobile communication can be certified as a ".mobileconfig" file from the JSS. The certificate of the configuration profile 145 is verified by a deployment/system management tool such as MDM or VMware AirWatch® of each instance of the installation target platform 103 upon deployment.

In block 520, the configuration profile automation engine 130 replaces any previously existing configuration profile with the configuration profile 145 resulting from block 250. Particularly in cases where known restrictions and settings were used in creating the binary property lists in blocks 310 and 320 of FIG. 3, the configuration profile automation engine 130 ensures that the newly generated configuration profile 145 for the current version of the software application 115 is to be selected by removing the preexisting configuration profile for a previous version of the software application 115, or by archiving the preexisting configuration profile for recovery/maintenance purposes only. Then, the configuration profile automation engine 130 proceeds with block 530.

In block 530, the configuration profile automation engine 130 creates the installer/uninstaller script 155 for the universal installation package 190 and associates the installer/uninstaller script 155 with the configuration profile 145 by the UUID key 147. Then, the configuration profile automation engine 130 proceeds with block 540.

In certain embodiments of the present invention, the configuration profile automation engine 130 has a template script, in typical script languages such as bash, for respective purposes of installation, uninstallation, and update of a configuration profile and/or a software application stored in the system configuration database 150. The configuration profile automation engine 130 generates the installer/uninstaller script 155 by filling in values in the template script with corresponding values from the restrictions and settings 143 of the configuration profile 145 and the UUID key 147 associated with the configuration profile 145. Further, the configuration profile automation engine 130 can prompt the packager 101 for a particular value for a specific restriction or a setting, or for the purpose of the script in order to select with which template script to begin, in generating the installer/uninstaller script 155.

The configuration profile automation engine 130 creates the installer/uninstaller script 155 to perform and to manage tasks of installation, uninstallation, and/or update of versions of the software application and respective configuration profiles corresponding to each task. In certain embodiments of the present invention, installer/uninstaller script 155 performs operations on all settings to run the universal installation package 190, including the configuration profile 145. The installer/uninstaller script 155 would be performed when a user on an instance of the installation target platform opens/accesses the universal installation package 190. Upon being invoked, the installer/uninstaller script 155 refers to the configuration profile 145 by the UUID key 147, as associated in block 530, in order to set system variables of a device of the installation target platform according to the restrictions and settings provided in the configuration profile 145. Because the installer/uninstaller script 155 accesses the configuration profile 145 by the UUID key 147, the installer/uninstaller script 155 in the universal installation package 190 has access to preexisting configuration profiles corresponding to previous versions of the software application 115, for removal and/or update.

In certain embodiments of the present invention, the installer/uninstaller script 155 manages installation, uninstallation, and update of the configuration profile 145 on a device of the installation target platform 103 by use of the UUID key 147 corresponding to the configuration profile 145. The software application 115 can be the same as the previous version as installed in the current device but needs to be reconfigured by use of a new configuration profile 145.

In certain embodiments of the present invention, the installation script, often referred to as an "installer", automatically invokes the uninstallation/update script 155 if necessary upon checking the preexisting configuration profile in the process of installing a new version of the software application 115 and the configuration profile 145 corresponding to the new version of the software application 115. If the restrictions and settings set forth in the preexisting configuration profile does not support the new version of the software application 115, the installer can invoke the uninstallation/update script 155, to resolve the incompatible restrictions and settings for the new version of the software application 115 by uninstalling/overwriting the previous version of the software application as well as the preexisting configuration profile corresponding to the previous version of the software application. In other embodiments of the present invention, the installer can opt to selectively update individual restriction or setting from the preexisting configuration profile for the new version of the software application 115, without uninstalling the previous version of the software application and the preexisting configuration profile as a whole.

In block 540, the configuration profile automation engine 130 creates the universal installation package 190 by combining the installer/uninstaller script 155, the software application 115, and the configuration profile 145, resulting from respective previous processes, together into a package file representing the universal installation package 190 and by finalizing settings to run the universal installation package 190 to have the universal installation package 190 ready for distribution. As noted, the configuration profile 145 can be referred from a future version of the software application 115, as being identified by the same UUID key 147 that is kept in the system configuration database 150. Alternatively, the configuration profile automation engine 130 provides a user interface through which the packager 101 can provide a new UUID key to look up the system configuration database 150 for a specific configuration profile that is not shared with the current version of the software application 115. Then, the configuration profile automation engine 130 proceeds with block 290 of FIG. 2.

FIG. 6 depicts an exemplary property list 600, in accordance with one or more embodiments set forth herein.

Line L601 is a file header in the body of a file for the exemplary property list 600, indicating that the file is in XML format encoded with Unicode Transformation Format (UTF) 8 encoding.

Line L602 includes document type definitions (DTDs) from the specified path for plist, as offered for Apple developers.

Line L603 indicates the file version of the plist. <plist> tag in line L603 and </plist> tag in line L613 encompass the body of the plist.

Line L604 indicates the elements following line L604 forms a dictionary of key-plist object pairs. <dict> tag in line L604 and </dict> tag in line L612 encompass the dictionary elements.

Lines L605 through L611 respectively represent each key-value pair, which is an item of configuration information referred to as restrictions and settings.

Line L605 indicates that a key "Label" is instantiated with "com.pkgr.test" string.

Line L606 indicates that a key "ProgramArguments" is instantiated with an array having a string element "/Users/pkgr/bin/test.sh". The "/Users/pkgr/bin/test.sh" indicates a path to a file that includes program arguments.

Line L607 indicates that a key "Nice" is of an integer type and instantiated with one (1).

Line L608 indicates that a key "StartInterval" is of an integer type and instantiated with sixty (60), indicating a sixty second delay to start the plist with the program "/Users/pkgr/bin/test.sh".

Line L609 indicates that a key "RunAtLoad" is of a Boolean type and instantiated with "true" value. The key "RunAtLoad" is to specify whether or not to run the program indicated by the "ProgramArguments" key upon startup of a device, referred to as "loading". As the "RunAtLoad" key has "true" value, the device is configured to run the program indicated by the "ProgramArguments" key, that is, "/Users/pkgr/bin/test.sh", upon startup. If the "RunAtLoad" key has "false" value, the device is configured to block "/Users/pkgr/bin/test.sh" from running upon startup.

Line L610 indicates that a key "StandardErrorPath" is instantiated with a string "/tmp/Test1.err", indicating a path for standard error log. Similarly, line L611 indicates that a key "StandardOutPath" is instantiated with a string "/tmp/Test1.out", indicating a path for standard outputs.

Keys in plist files can be of any data types defined in the "https://www.apple.com/DTDs/PropertyList-1.0.dtd" from line L602, which includes "array", "data", "date", "dict", "real", "integer", "string", "true", and "false".

Each restriction or setting specified in the property list configures a device instance of the installation target platform 103, that is, a computer system running macOS. As noted, the configuration profile 145, as an entirety of restrictions and settings for installing and running the software application 115, can be dispersed across multiple property lists.

FIG. 7 depicts an exemplary installer/uninstaller script 700 for the universal installation package 190, as generated by the configuration profile automation engine 130, in accordance with one or more embodiments set forth herein.

As presented in description of block 530 of FIG. 5, the configuration profile automation engine 130 creates the installer/uninstaller script 155 by filling the UUID key 147 that identifies the configuration profile 145, as provided by the packager 101 or created by the configuration profile automation engine 130, in a template script. The exemplary script 700 represents a few aspects of the resulting script to be included in the universal installation package 190 for deployment.

Line L701 indicates that the script is a bash shell script that is executable. Global variables in lines L702 through L712 are instantiated by the configuration profile automation engine 130, either automatically or interactively based on inputs from the packager 101. The variable "cpPayLoadUUID" of line L702 is instantiated with a UUID value, which is an identifier of .plist file converted to .mobileconfig file used to create the universal installation package 190 for deployment. In the present example, the value of cpPayLoadUUID variable indicates the configuration profile for installation. The value of the variable "otherPayLoadUUID" of line L703 indicates a configuration profile to update or to remove for management purposes.

Line L704 specifies the name of a currently selected configuration profile with a variable profileName having a value "SecurityUnsigned.mobileconfig".

Line L705 specifies that a variable listProfiles is instantiated with a list of profile identifiers existing in a current device, resulting from running "/usr/bin/profiles-P". The value of the listProfiles variable is used to determine which one of installation, update, and uninstallation task should be performed, as shown in lines L709 and L710.

Lines L706 and L707 respectively specifies variables corresponding to output format of "/usr/bin/profiles-P" for the cpPayLoadUUID variable for installation and the otherPayLoadUUID for uninstallation.

Line L708 specifies a variable profilePath having a path "/private/tmp/com.ibm.ConfigurationProfile".

Line L709 specifies a variable isProfile having a value indicating if a profile identifier having the same value as cpPayLoadUUID value is present in the current device.

Lines L710 through L712 specifies a variable otherProfile having a value indicating if any previous version of profile, represented by an identifier same as otherPayLoadUUID, is present in the current device.

Lines L713 through L715 specifies an if block, having a condition if any previous version of profiles identified in the current device (otherProfile) is identified for uninstallation (otherPayLoadUUID) determined, and if the condition has been met, then uninstalls the identified profiles by use of "/usr/bin/profiles -R -p".

Lines L716 through L735 specify another if-block based on a decision if the profile to install having the identifier equal to the value of "cpPayLoadUUID" had been selected. If the profile to install identified by "cpPayLoadUUID" had not been selected, lines L733, then the script stops with "exit 0", indicating a successful termination, in line L734.

If the profile to install identified by "cpPayLoadUUID" had been selected in line L716, then another if-block of lines L717 through L732 is performed.

In the if-block of lines L717 through L732, the selected profile identifier is validated in line L717. If the selected profile identifier is successfully validated in line L717, then lines L718 through L725 are performed. If the selected profile identifier is not validated in line L717, then the lines L727 through L731 are performed.

In lines L718 through L725, the selected profile is installed in line L718. The profile is checked again in line L719, and if the profile is determined to be invalid in line L719, then the invalid profile is reported in line L720, the directory path to the invalid profile is removed in line L721, and the script terminates with exit status code 2, an error code designated for invalid profile.

In line L724, the directory path to the installed profile is removed, subsequent to the installation of L718. Then the script terminates with exit status 0, indicating that the script had been successfully performed with no error.

In lines L727 through L731, where the else condition in line L726 is met, because the profile cannot be find, the result is reported in line L727, checks if the directory path for the profile exists in line L728, removes the profile path checked in line L729, and, in line L731, terminates the script with exit status code 3, indicating that a file matching the configuration profile had not been found.

Certain embodiments of the present invention automatically generates a configuration profile, a UUID key used as a unique identifier for the configuration profile, and an installer/uninstaller script to install and manage the configuration profile on any device of the installation target platform. Certain embodiments of the present invention offers the configuration profile that is error-free, secure, and user-friendly with customization and management, in contrast with configuration profiles manually generated by conventional snapshot method. The configuration profile is also efficient as inducing less network traffic for installation by enclosing the configuration profile in the universal installation package. Certain embodiments of the present invention supports the system configuration database storing the UUID keys to search and identify previously installed configuration profile corresponding to previous versions of the same software application. Certain embodiments of the present invention improves the security of the device with the configuration profile by certifying the configuration profile and by preventing end user access and modification. Certain embodiments of the present invention improves productivity in generating the configuration profile by automating the process of generating the configuration profile, with less errors and redundancies, particularly when the configuration profile is complex and sizable. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The configuration profile automation service can be provided for subscribed business entities/vendors of software applications in need from any location in the world.

Figure 8:
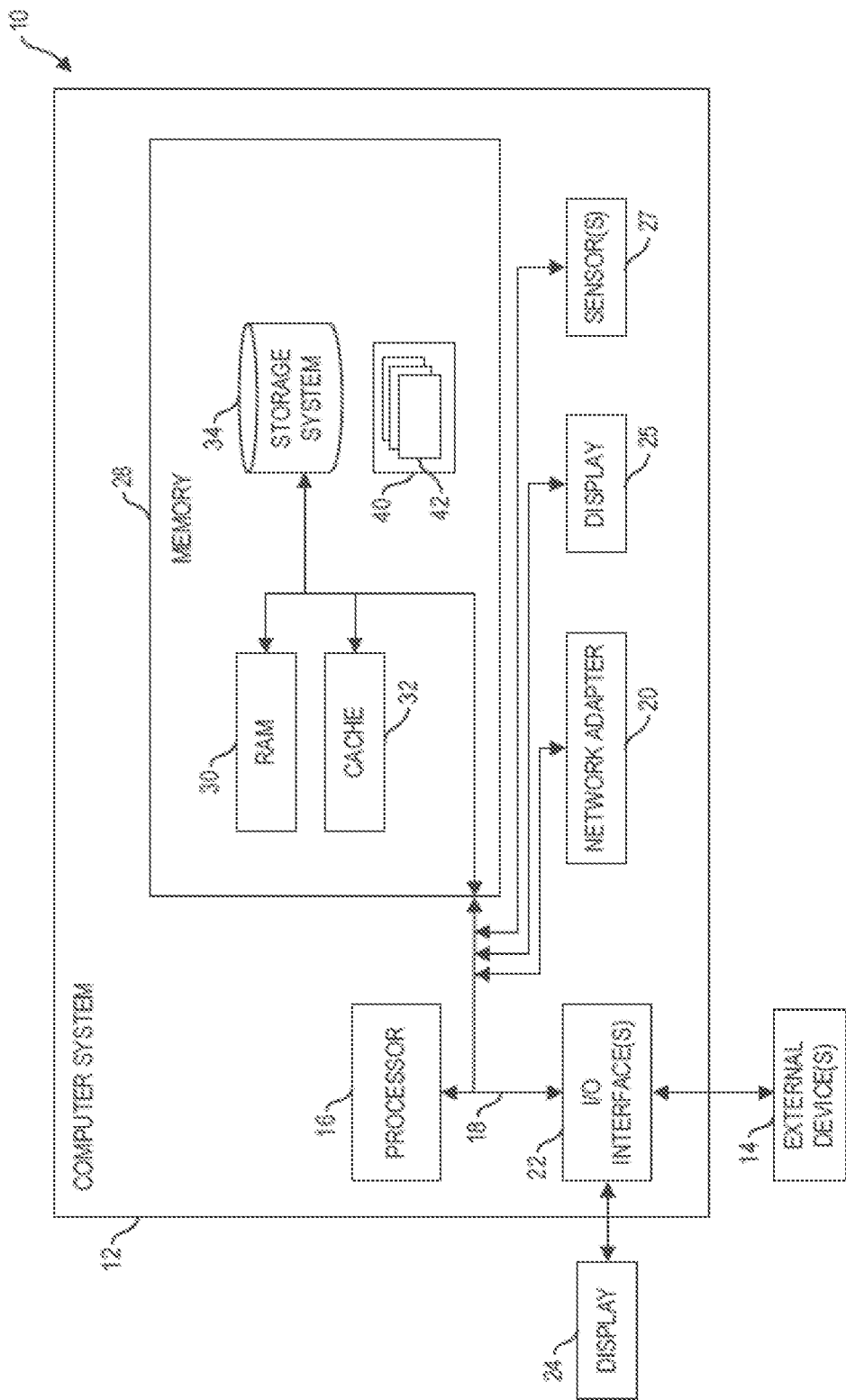
FIG. 8 depicts a cloud computing node according to an embodiment of the present invention.
Figure 9:
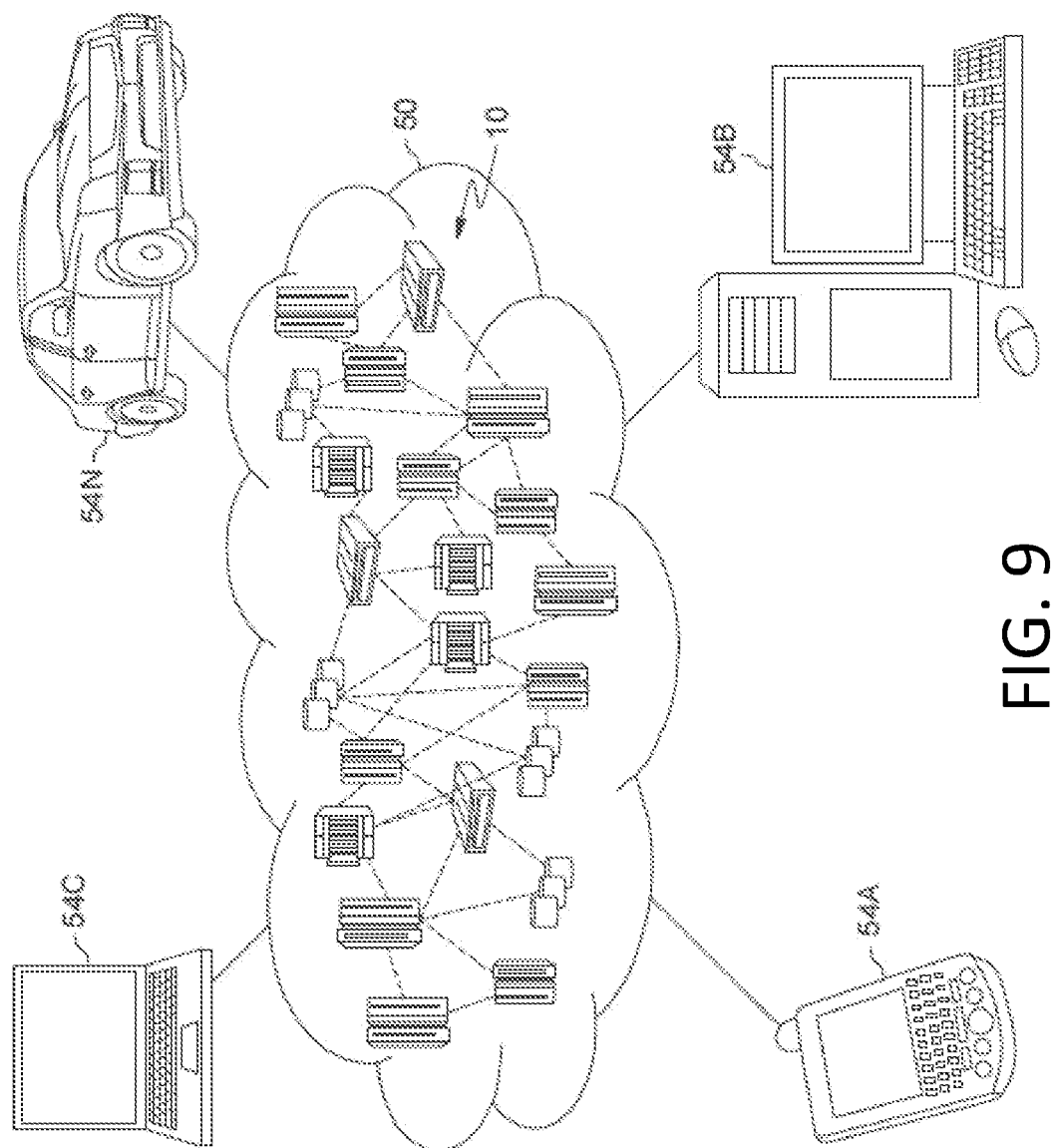
FIG. 9 depicts a cloud computing environment according to an embodiment of the present invention.
Figure 10:
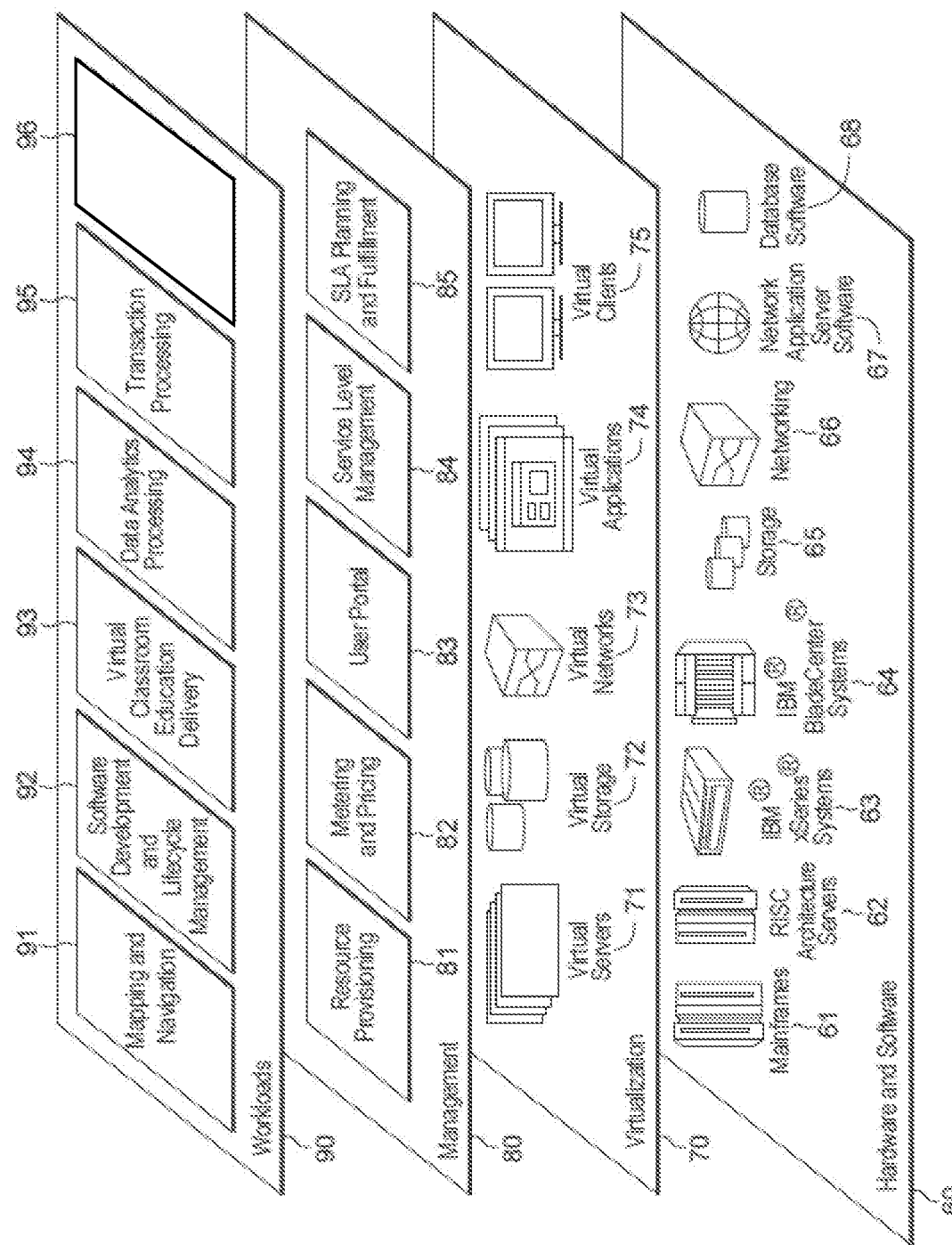
FIG. 10 depicts abstraction model layers according to an embodiment of the present invention.

FIGS. 8-10 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the configuration profile automation engine 130 and the configuration profile automation system 120 of FIG. 1, respectively. Program processes 42, as in the configuration profile automation engine 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the configuration profile automation services as provided by the configuration profile automation system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
generating, by one or more processor, one or more property list including restrictions and settings and respective values thereof to install a software application on devices running an installation target operating system, the generating comprising:
  determining that the restrictions and settings and the respective values thereof are known from the one or more property list for a previous version of a configuration profile based on a profile identifier;
  storing the restrictions and settings and the respective values thereof from the determining into the one or more property list in a human-readable file format;
  verifying the restrictions and settings and the respective values thereof from the storing by applying the restrictions and settings and the respective values thereof to the device running the installation target operating system; and
  prompting a packager for any modification on the restrictions and settings and the respective values thereof from the verifying;
creating a new version of the configuration profile based on the one or more property list from the generating, wherein the new version of the configuration profile corresponds to the profile identifier that uniquely identifies the configuration profile;
building a universal installation package including the new version of the configuration profile and a script including the profile identifier is universally applicable to the devices, wherein the script is utilized for installing and managing the configuration profile on the devices; and
uploading, by the one or more processor, the universal installation package to a management tool of the installation target operating system for deployment on the devices.

2. The computer implemented method of claim 1, the creating comprising:
forming the configuration profile by combining the restrictions and settings and the respective values thereof of the one or more property list from the generating;
rendering the profile identifier by use of a predefined method;
recording the profile identifier from the rendering in a system configuration database; and
encrypting the configuration profile in a binary format.

3. The computer implemented method of claim 2, wherein the predefined method used in the rendering is a universally unique identifier (UUID) key standard.

4. The computer implemented method of claim 1, the building comprising:
certifying the configuration profile from the creating by use of a certificate authority recognizable in the installation target operating system;
producing the script by filling the profile identifier for the certified configuration profile in a template script; and
assembling the certified configuration profile and the produced script.

5. The computer implemented method of claim 4, wherein the profile identifier is a UUID key for the configuration profile corresponding to all versions of the software application, and wherein the script is a bash script.

6. A computer program product comprising:
a computer readable storage medium readable by one or more processor and storing instructions for execution by the one or more processor for performing a method comprising:
generating one or more property list including restrictions and settings and respective values thereof to install a software application on devices running an installation target operating system, the generating comprising:
  determining that the restrictions and settings and the respective values thereof are known from the one or more property list for a previous version of a configuration profile based on a profile identifier;
  storing the restrictions and settings and the respective values thereof from the determining into the one or more property list in a human-readable file format;
  verifying the restrictions and settings and the respective values thereof from the storing by applying the restrictions and settings and the respective values thereof to the device running the installation target operating system; and
  prompting a packager for any modification on the restrictions and settings and the respective values thereof from the verifying;
creating a new version of the configuration profile based on the one or more property list from the generating, wherein the new version of the configuration profile corresponds to the profile identifier that uniquely identifies the configuration profile;
building a universal installation package including the new version of the configuration profile and a script including the profile identifier is universally applicable to the devices, wherein the script is utilized for installing and managing the configuration profile on the devices; and
uploading the universal installation package to a management tool of the installation target operating system for deployment on the devices.

7. The computer program product of claim 6, the creating comprising:
forming the configuration profile by combining the restrictions and settings and the respective values thereof of the one or more property list from the generating;
rendering the profile identifier by use of a predefined method;
recording the profile identifier from the rendering in a system configuration database; and
encrypting the configuration profile in a binary format.

8. The computer program product of claim 7, wherein the predefined method used in the rendering is a universally unique identifier (UUID) key standard.

9. The computer program product of claim 6, the building comprising:

certifying the configuration profile from the creating by use of a certificate authority recognizable in the installation target operating system;

producing the script by filling the profile identifier for the certified configuration profile in a template script; and assembling the certified configuration profile and the produced script.

10. The computer program product of claim 9, wherein the profile identifier is a UUID key for the configuration profile corresponding to all versions of the software application, and wherein the script is a bash script.

11. A system comprising:

a memory;

one or more processor in communication with the memory; and program instructions executable by the one or more processor via the memory to perform a method comprising:

generating one or more property list including restrictions and settings and respective values thereof to install a software application on devices running an installation target operating system, the generating comprising:

determining that the restrictions and settings and the respective values thereof are known from the one or more property list for a previous version of a configuration profile based on a profile identifier;

storing the restrictions and settings and the respective values thereof from the determining into the one or more property list in a human-readable file format;

verifying the restrictions and settings and the respective values thereof from the storing by applying the restrictions and settings and the respective values thereof to the device running the installation target operating system; and prompting a packager for any modification on the restrictions and settings and the respective values thereof from the verifying;

creating a new version of the configuration profile based on the one or more property list from the generating, wherein the new version of the configuration profile corresponds to the profile identifier that uniquely identifies the configuration profile;

building a universal installation package including the new version of the configuration profile and a script including the profile identifier is universally applicable to the devices, wherein the script is utilized for installing and managing the configuration profile on the devices; and uploading the universal installation package to a management tool of the installation target operating system for deployment on the devices.

12. The system of claim 11, the creating comprising:

forming the configuration profile by combining the restrictions and settings and the respective values thereof of the one or more property list from the generating;

rendering the profile identifier by use of a predefined method;

recording the profile identifier from the rendering in a system configuration database; and encrypting the configuration profile in a binary format.

13. The system of claim 11, the building comprising:

certifying the configuration profile from the creating by use of a certificate authority recognizable in the installation target operating system;

producing the script by filling the profile identifier for the certified configuration profile in a template script; and assembling the certified configuration profile and the produced script.

14. The system of claim 13, wherein the profile identifier is a UUID key for the configuration profile corresponding to all versions of the software application, and wherein the script is a bash script.

* * * * *